United States Patent [19]

Davison, Jr.

[11] 4,111,104

[45] Sep. 5, 1978

[54] ENGINE WITH LOW FRICTION PISTON

[75] Inventor: Ellard D. Davison, Jr., Grosse Pointe Farms, Mich.

[73] Assignee: General Motors Corporation, Detroit, Mich.

[21] Appl. No.: 783,052

[22] Filed: Mar. 30, 1977

[51] Int. Cl.² ............................................. F01B 31/00
[52] U.S. Cl. ................................... 92/127; 123/193 P
[58] Field of Search ............... 92/86.5, 159, 127, 160, 92/181 R; 123/193 CP, 193 P

[56] References Cited

U.S. PATENT DOCUMENTS

| 1,679,964 | 8/1928 | Edwards | 92/127 |
| 3,058,792 | 10/1962 | Elford et al. | 92/127 |
| 3,142,262 | 7/1964 | Firth et al. | 92/127 X |
| 3,319,534 | 5/1967 | Boonshaft | 92/181 R |
| 3,667,443 | 6/1972 | Currie et al. | 123/193 P |
| 4,050,360 | 9/1977 | Powers et al. | 92/127 |

FOREIGN PATENT DOCUMENTS 194,959   3/1923   United Kingdom ...................... 92/127

Primary Examiner—Irwin C. Cohen
Attorney, Agent, or Firm—Robert J. Outland

[57] ABSTRACT

Engine piston arrangements including at least one friction reducing gas bearing recess in a thrust loaded portion of the piston skirt and connected to the space between the top two piston rings to provide blowby gas to pressurize the bearing recess and support at least part of the thrust forces on the piston skirt.

8 Claims, 6 Drawing Figures

4,111,104

ENGINE WITH LOW FRICTION PISTON

BACKGROUND OF THE INVENTION

This invention relates to reciprocating piston machines, especially engines, and particularly to internal combustion engines of the reciprocating piston type wherein thrust loads are applied to the piston skirt during operation.

It is known in the art that a portion of the friction loss occurring in reciprocating piston type internal combustion engines is attributable to the friction resulting from the sliding of the piston skirts along the cylinder walls while subject to thrust forces imposed by the working gas and inertia forces applied to the pistons and acting upon the mechanical output crank linkage. Thus, it is recognized that any reduction of the thrust forces between the piston and cylinder should result in a reduction of engine friction losses and increased efficiency.

SUMMARY OF THE INVENTION

The present invention provides a novel piston construction incorporating gas bearing means in the skirt which make use of the pressures of piston blowby gases to at least partially support thrust loads between the piston and cylinder wall, thereby reducing friction losses and increasing engine efficiency. The invention is applicable to internal combustion engines and other mechanisms having reciprocating pistons and using conventional connecting rod and crank output mechanisms or similar output mechanisms which result in the creation of significant side thrust forces or loads acting between the pistons and cylinder walls during periods when there is significant gas loading on the pistons from their combustion or working chambers.

The invention provides gas bearing recesses, sometimes called bearing pads, in the piston skirts at one or both of their main thrust loaded positions. Gas for pressurizing the gas bearing pads is provided through connection of the pads with the clearance space between the first and second piston rings adjacent the combustion or working chamber. In this space blowby gas exists generally at a pressure intermediate the pressure in the working chamber and the pressure in the lower part of the cylinder adjacent the piston skirt. Various additional features and alternative arrangements of the invention are provided for accomplishing the desired purposes, as will be seen from the following description of certain preferred embodiments taken together with the accompanying drawings.

DESCRIPTION OF THE ILLUSTRATED EMBODIMENTS

Figure 1:
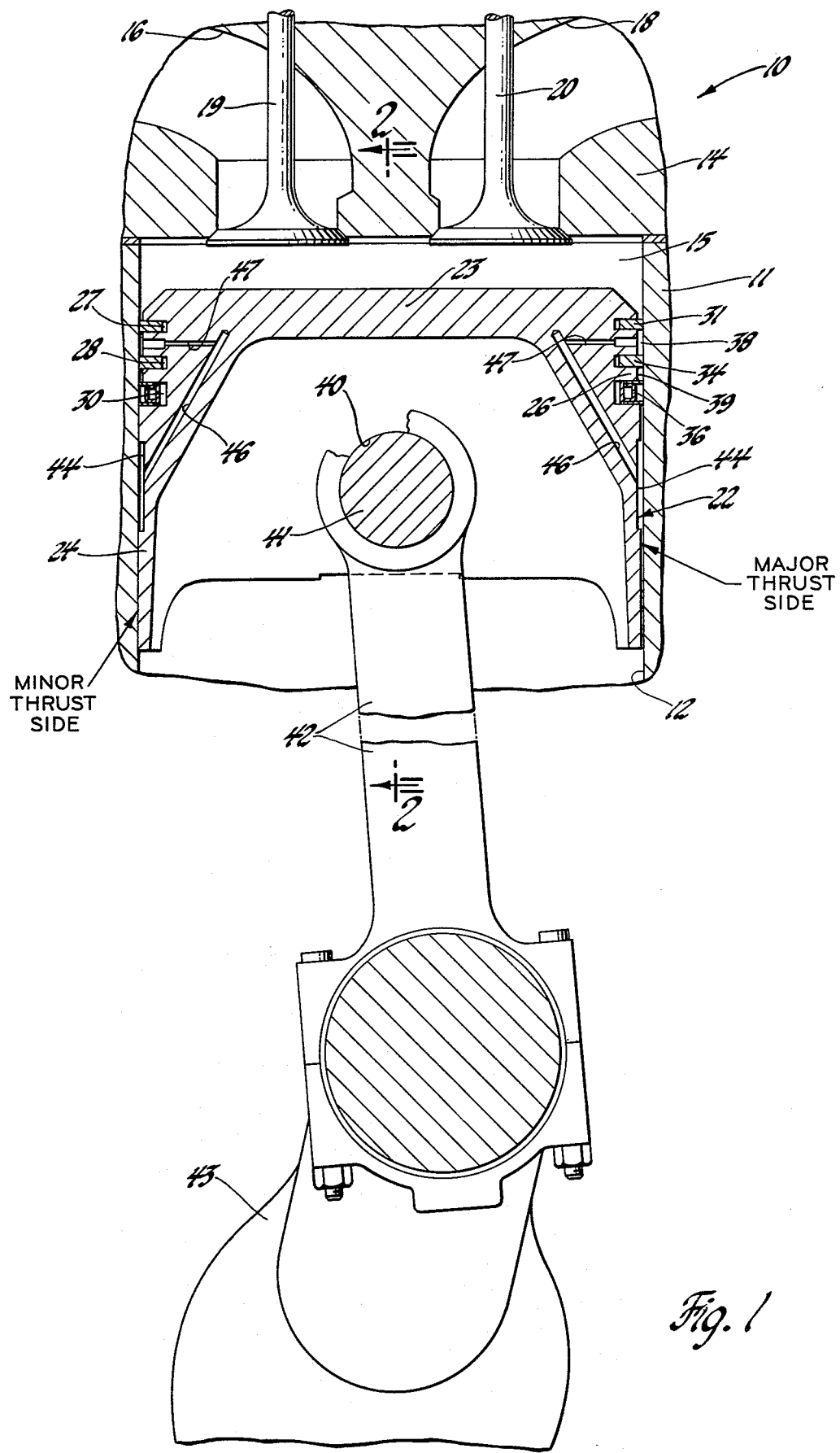
FIG. 1 is a transverse cross-sectional view of a portion of an internal combustion engine having low friction piston means formed in accordance with the invention.
Figure 2:
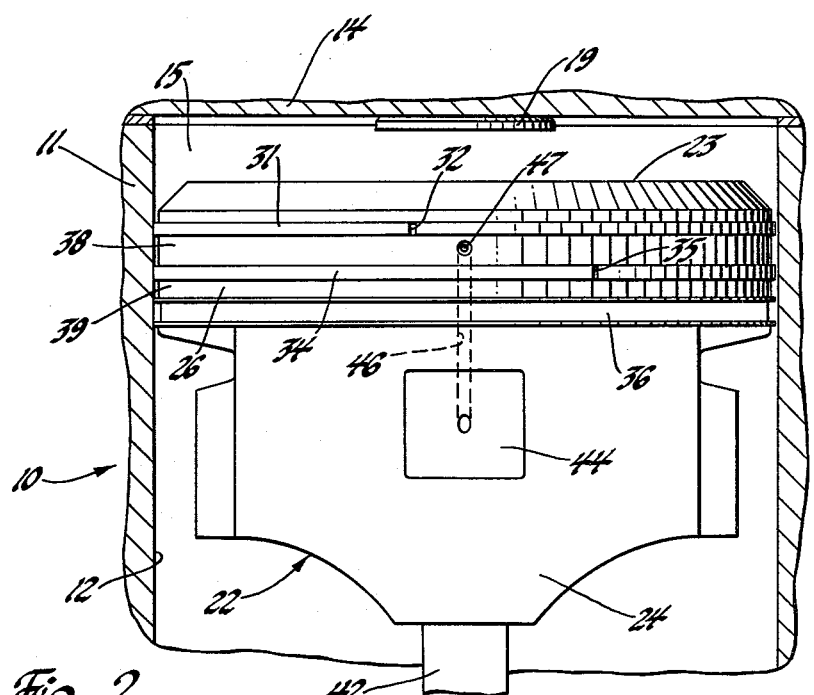
FIG. 2 is a longitudinal partial cross-sectional view of the engine of FIG. 1 showing additional details of the novel engine piston arrangement.

Referring first to FIGS. 1 and 2 of the drawings, there is shown an internal combustion engine generally indicated by numeral 10. Engine 10 includes means such as a conventional cylinder block 11 defining a plurality of cylinders 12, only one of which is shown. The ends of the cylinders are conventionally closed by a cylinder head 14 to partially define combustion chambers 15 at the cylinder ends. Intake and exhaust ports 16 and 18 conventionally controlled by poppet valves 19 and 20, respectively, are provided in the cylinder head connecting with the combustion chambers to provide for the admission of air or air-fuel mixture to the combustion chambers and the exhaust of combustion products from the combustion chambers.

Within each of the cylinders 12 there is a piston 22 having a closed end wall 23, a depending cylindrical side wall or skirt 24 which may be interrupted to form a plurality of part cylindrical surfaces connected with the end wall 23, and an annular ring belt 26 extending peripherally between the depending skirt 24 and the end wall 23.

The piston is arranged for slidable reciprocating motion within the cylinder, the piston skirt being engagable with the cylindrical cylinder wall to guide the piston in its reciprocating motion and absorb side thrust forces which may be imposed on the piston. The outer diameter of the cylindrical piston skirt is made somewhat smaller than the diameter of the cylinder in order to provide a limited clearance, as is conventionally done to permit lubricating oil to remain on the cylinder walls between the opposing surfaces for the reduction of friction in conventional fashion and to provide for a free sliding motion of the piston within the cylinder. The piston end wall 23 forms one wall of the combustion chamber 15 which, upon movement of the piston, causes the expansion or contraction of the chamber 15, as is required for operation on a conventional engine working cycle.

The piston ring belt 26 is conventionally provided with a plurality of peripherally extending axially spaced piston ring grooves which, in the present instance, consist of a first ring groove 27 extending closest to the end wall 23 and combustion chamber 15, a second ring groove 28 spaced from the first in a direction away from the combustion chamber and a third ring groove 30 spaced from the second also in a direction away from the combustion chamber and extending closely adjacent the piston skirt.

The first ring groove is provided in conventional manner with a compression sealing ring 31 in engagement with the cylinder and having a gap 32 that permits expansion and contraction of the ring as necessary to maintain cylinder wall engagement. The second ring groove is provided with a second compression ring 34 similar to ring 31 and engaging the cylinder wall in similar fashion. Ring 34 is also provided with a gap 35 to permit its expansion and contraction as required. The third ring groove 30 is provided with an oil control ring 36 of conventional construction.

The piston rings have the dual purpose of sealing, albeit imperfectly, the combustion and working chamber 15 against the escape of pressurized working and combustion gases therein into the engine crankcase and of limiting the passage of lubricating oil from the engine cylinder wall upwardly into its respective combustion chamber. Such sealing is imperfect due to the required ring gaps needed for expansion, as well as other mechanical exigencies, so that a limited amount of gas escapes from the intermittently pressurized combustion chamber past the piston rings and into the engine crankcase. Thus, annular clearance spaces 38 and 39, which are respectively defined by the top two and bottom two piston rings, are intermittently pressurized by leaking blowby gases existing at pressures generally intermediate that in the cylinder combustion chamber 15 and that in the lower portion of the cylinder adjacent the piston skirt which is exposed to the near ambient pressures of the engine crankcase.

In order to utilize the piston 22 as a means for developing power, the piston is provided with a lateral opening 40 having a piston pin 41. The pin 41 connects the piston through a connecting rod 42 with an eccentric throw of a crankshaft 43, as is common in reciprocating piston engines. Reciprocation of the piston in the cylinder causes in turn rotation of the crankshaft 43. The angular position of the connecting rod varies as the crankshaft rotates so that forces acting on the piston in an axial direction are resolved partially into a side thrust component which alternately acts in opposite directions transversely on the piston, causing thrust forces between the piston skirt and the engine cylinder. These forces act in the plane of movement of the engine connecting rod and thus are concentrated at two opposite sides of the piston and are taken up primarily by the depending piston skirt portions laterally opposite the piston pin, which skirt portions may be referred to as thrust receiving portions.

Since a large part of the axial piston forces are due to gas pressures in the combustion chamber 15, the thrust forces acting on the piston vary with these gas pressures. Normally then, the largest thrust forces act on one side of the piston, called the major thrust side and are largely caused by combustion gas pressures, while the opposite side of the piston, called the minor thrust side, has lower pressures caused largely by compression pressures in the combustion chamber, which are lower than combustion pressures. The side thrust forces, which act upon the piston cyclically, urge the piston skirt alternately into engagement with opposite sides of its respective cylinder wall which, in view of the piston reciprocating motion, results in a certain amount of friction even through the cylinder wall is lubricated. Thus a portion of the energy being developed by the engine is lost through heat developed by the friction of the piston skirt sliding in the cylinder.

The present invention provides supplemental gas bearing means in the piston skirt which act to support some of the piston thrust loads, reducing the friction losses that would otherwise occur. In the embodiment of FIGS. 1 and 2 the bearing means comprise a pair of shallow gas bearing recesses (or bearing pads) 44 which are of limited axial and peripheral extent and are provided at the opposite major and minor thrust sides of the piston skirt facing the cylinder on either side of the piston pin location. These pads are individually connected through diagonally drilled passages 46 and laterally drilled smaller diameter restrictor passages 47 with the annular clearance space 38 formed between the first and second piston rings and their respective ring grooves.

In operation, reciprocation of the engine piston alternately contracts and expands the combustion chamber causing, in predetermined portions of the engine cycle, compression of an air or air-fuel mixture charge and, upon ignition and burning causing a higher pressure increase, expansion of the burned gases. During the upward compression stroke of the piston, the compression pressures developed in the combustion chamber, acting through the angled connecting rod, result in a thrust load of the piston against the cylinder wall on the minor thrust side of the piston skirt. Subsequently, on the downward expansion stroke of the piston, the higher combustion gas pressures result in greater piston thrust loads against the cylinder wall on the major thrust side of the piston skirt.

During periods when the combustion chamber is pressurized, some of the combustion chamber gas leaks past the first compression ring 31 and through its gap 32 into the annular clearance space 38 between the first and second piston rings, thus increasing its pressure. Some portion of this blowby gas also leaks past the second and third piston rings and along the piston skirt to the lower portion of the cylinder which is at crankcase pressure, normally near the ambient air pressure. By virtue of its location adjacent the combustion chamber, the pressure in the annular clearance space 38 is normally at a level below, but relatively nearer, the pressure in the combustion chamber than that in the engine crankcase. Thus, during the pressurized periods of the combustion chamber, some of the so-called blowby gas leaking into the annular clearance space 38 is forced through the restrictor passages 47 and their connecting passages 46 to the bearing pads or recesses 44 in the piston skirt.

If the piston at this point is on its compression stroke, the thrust forces acting on the piston will be urging the piston sideways so that the minor thrust side of the piston skirt tends to engage the cylinder wall, while the major thrust side of the piston skirt tends to be moved away from the cylinder wall to the extent permitted by the side clearance. As a result, blowby gas which is supplied from the annular clearance space 38 to the bearing pad 44 on the minor thrust side of the piston is restricted from escaping by engagement of the skirt against the cylinder wall and the pad thereby becomes pressurized to a pressure close to that in the annular clearance space. This pressure then acts between the piston skirt and the cylinder wall to support at least part of the piston thrust load and reduce the mechanical engagement of the piston skirt against the cylinder wall. In this way, the force of friction between the skirt and cylinder wall is also reduced. At the same time, on the major thrust side of the piston the clearance between the piston skirt and cylinder wall allows leak-off of the blowby gas supplied to that bearing and thus little or no pressure is developed at this point to offset the bearing pad pressure on the minor thrust side. The restrictor passages 47 are sized so that the flow of blowby gas to the two bearing pads is limited in order to prevent drawing off of the pressure in the annular clearance space 38 to the side of the piston where the clearance is greater. This then permits the build-up of pressure in the bearing pad on the side of the piston toward which the thrust forces are directed.

Obviously, the bearing pads operate in the same manner when the piston is on its downward working stroke under combustion gas pressures to supply pressurized blowby gas to the pad on the major thrust side which becomes pressurized and helps support the thrust loads exerted by the piston against the cylinder wall. At the same time, the restricted amount of blowby gas supplied to the bearing pad on the minor thrust side is dissipated by the piston-to-cylinder clearance so that a significant pressure is not built up on his side of the piston.

It may be seen that the action of the arrangement described is to utilize blowby gas pressures to help support or offset the force of piston thrust against the cylinder side wall during both the compression and expansion strokes of the piston. In this way the friction force generated by the force of engagement of the piston's skirt on the cylinder wall is reduced under both major and minor thrust conditions and the engine operating efficiency is proportionally increased.

It should be apparent that to the extent that pressure in the annular clearance space can be maintained relatively close to the pressure in the combustion chamber, the effect of the blowby gas air bearing support system in reducing friction will be maximized. Thus, it is desirable that the gap 35 in the second piston ring 34 be maintained as small as possible to reduce the amount of blowby gas leakage past this ring. At the same time, the gap 32 in the top or first piston ring 31 is desirably larger than the gap 35 to allow freer flow of blowby gas into the clearance space 38 than out of it past the second ring. However, the size of gap 32 must be limited to prevent excessive blowby and pressure loss from the combustion chamber, which, if permitted, would cause a loss in efficiency that might offset the gain provided by the gas bearings in the piston skirts.

Figure 3:
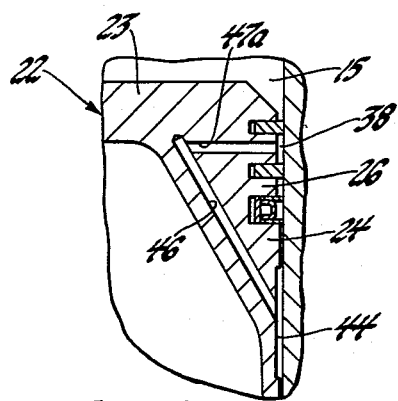
FIG. 3 is a fragmentary transverse cross-sectional view illustrating an alternative embodiment of the invention in which a bearing pad is located at only one of the two main areas of piston thrust loading.

Referring now to FIG. 3 of the drawings, the construction thereshown is, in most respects, identical to that of the arrangement of FIGS. 1 and 2. Thus, like reference numerals have been utilized for comparable parts. The arrangement of FIG. 3 differs in that only the major thrust side of the piston skirt is provided with a blowby gas bearing pad and connecting passages and that the lateral passage 47a, which connects with passage 46, is not formed as a small diameter restrictor passage. With this arrangement, only the major piston skirt thrust loads caused by combustion pressures in the combustion chamber are offset by blowby gas pressure provided to the gas bearing pad 44 during the time when the piston is on its downward expansion stroke. On the upward compression stroke, the blowby gas supplied to pad 44 leaks off into the clearance space and thus does not increase the minor thrust load in a significant amount. If desired, a restrictor passage like passage 47 in the embodiments of FIGS. 1 and 2 may be utilized in the embodiment of FIG. 3 instead of the open passage 47a, although the need for a restrictor passage is not as great, since the gas from the annular clearance space 38 is supplied only to the one bearing pad.

Figure 4:
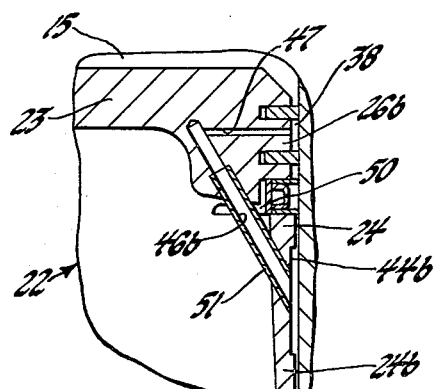
FIG. 4 is a fragmentary transverse cross-sectional view illustrating the application of the invention to a different form of piston construction.

The embodiment of FIG. 4 is similar to that of FIGS. 1 and 2, except that the construction of the piston differs slightly by virtue of separation of a portion of the skirt 24b from the ring belt 26b by a slot 50. This necessitates that the bearing pad 44b be supplied by passages 46b defined in part by pressed in tubes 51, which extend from the skirt 24b to the ring belt portion 26b of the piston.

Figure 5:
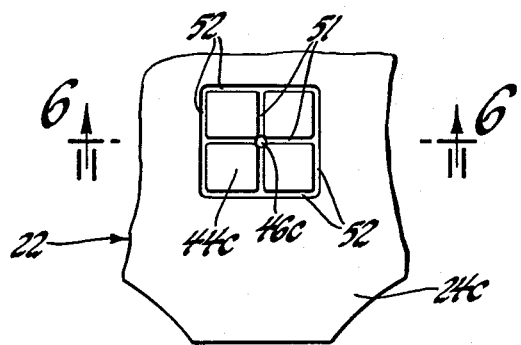
FIG. 5 is a side view of a portion of an engine piston illustrating an alternative embodiment of bearing pad construction.
Figure 6:
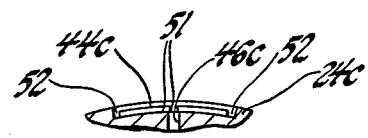
FIG. 6 is a cross-sectional view through the bearing pad of FIG. 5 and taken in the plane generally indicated by the line 6—6 of FIG. 5.

FIGS. 5 and 6 disclose an alternative embodiment of bearing pad 44c wherein the passage 46c opens in the piston skirt 24c to a pattern of grooves 51, 52 which extend respectively across the face and around the periphery of the bearing pad 44c to aid the distribution of blowby gas over the surface of the pad during the short intervals when the pad is pressurized.

While the invention has been described by reference to certain embodiments chosen for purposes of illustration, it should be understood that numerous additional changes could be made wtihin the scope of the inventive concepts disclosed. Accordingly, it is intended that the invention not be limited to the specific forms disclosed, but that it have the full scope permitted by the language of the following claims.

What is claimed is:

1. An engine having at least one cylinder closed at one end and having means for admitting working fluid to and discharging working fluid from the closed end, a piston having a side wall and a closed end with a pair of axially spaced peripheral ring grooves between the closed end and the side wall, said piston being reciprocably received in the cylinder with the closed ends of the piston and cylinder opposing one another to define a variable volume working chamber in which a working fluid may be pressurized, said piston being connected with an output shaft through means converting a portion of the working gas pressures into side thrust forces, the piston side wall being in closely spaced relation to and slidingly engagable with the cylinder to transfer the side thrust forces thereto, a first compression piston ring in the ring groove closest the piston closed end and a second compression piston ring in the other ring groove, said rings engaging the cylinder to imperfectly seal the working chamber and limit leakage of the working fluid toward the piston skirt, said piston rings, piston and cylinder together defining an annular clearance space between the rings which normally contains fluid at a pressure intermediate the pressures in the working chamber and at the piston skirt, at least one fluid bearing recess in the side wall and extending partially thereabout, said recess facing the cylinder at a portion of side thrust transfer thereto, and passage means in the piston passing inwardly of the second piston ring and exclusively communicating the annular clearance space with the bearing recess whereby pressurized fluid is conducted from the clearance space to the recess to provide a separating force tending to offset the thrust loads acting between the piston and cylinder, thus reducing sliding friction at the piston-cylinder interface.

2. The combination of claim 1 and further comprising a second bearing recess in the piston side wall on the side opposite from the first recess, said second recess extending partially about the side wall and facing the cylinder at another position of side thrust transfer to the cylinder, and passage means in the piston passing inwardly of the second piston ring and exclusively communicating the annular clearance space with said second bearing recess, said piston side wall having a diameter sufficiently smaller than said cylinder to provide a clearance between the piston and cylinder on the unloaded side sufficient to permit the escape of pressure from the adjacent bearing recess, and restriction means in the passages leading to said bearing recesses to limit the flow of fluid thereto from said annular clearance space whereby the loss of fluid from one bearing recess is prevented from depressurizing the annular clearance space supplying the other bearing recess.

3. A low friction piston for use in an engine cylinder and comprising a closed end adapted to be exposed to working gas pressures, means defining a pair of axially spaced peripheral compression ring grooves adjacent the closed end and adapted to receive compression rings for sealing the working gas, and a side wall depending from the closed end to guide the piston in a cylinder and absorb thrust loads imposed thereon, the ring grooves being disposed between the side wall and the closed end, and the improvement comprising at least one gas bearing recess in the side wall and extending partially thereabout, said recess being located to face the cylinder at a position of side thrust transfer thereto, and passage means in the piston passing inwardly of the ring groove farthest from the piston closed end and exclusively communicating the bearing pad with the space between the piston ring grooves to supply pressurized blowby gas to the bearing pad to aid in supporting piston thrust loads and thereby reduce the friction produced by direct engagement of the piston skirt with the associated cylinder wall.

4. A piston for an internal combustion engine, said piston defining a transverse piston pin opening and having a closed end spaced from the piston pin opening in an axial direction, a side wall depending from the closed end and having thrust receiving portions spaced laterally from the piston pin opening, a pair of axially spaced peripheral compression piston ring grooves between the closed end and the side wall and the improvement comprising a gas bearing recess in the side wall and extending partially thereabout at one of said thrust receiving portions and passage means passing inwardly of the ring groove farthest from the piston closed end and exclusively connecting said bearing recess with the space between said piston ring grooves to supply pressurized blowby gas to the bearing pad for supporting some of the side thrust load acting on the piston side wall.

5. A piston as defined in claim 4 and further comprising a second gas bearing pad in the piston side wall and disposed in the thrust receiving portion thereof located opposite that containing the first named bearing pad, second passage means passing inwardly of the ring groove farthest from the piston closed end and exclusively connecting said second bearing pad with the space between said piston ring grooves, both said passage means containing restrictor means to limit the flow of blowby gas to the respective pads so that the leakage of blowby gas from one of the pads will not deplete the supply of blowby gas to the other pad.

6. The combination of claim 4 wherein said piston side wall is locally disconnected from said ring groove defining means and said passage means connecting the bearing pad with the space between the piston ring grooves is defined in part by a separate tube member retained in and extending between the piston side wall and the ring groove defining means.

7. The combination of claim 4 wherein said gas bearing pad comprises a shallow recess with deeper grooves extending across the face thereof and intersecting with one another, at least some of said grooves connecting with the passage means supplying said bearing pad with blowby gas.

8. An internal combustion engine having a cylinder closed at one end and means for admitting air to and discharging combustion products from the closed end, a piston having a closed end and a side wall with a pair of axially spaced peripheral ring grooves between the closed end and side wall, the piston being reciprocably received in the cylinder with the closed ends of the piston and cylinder opposing one another to define a variable volume combustion chamber in which the air may be pressurized mechanically and by the burning of fuel therein, a transverse piston pin carried by the piston at a point laterally intermediate thrust receiving portions of the piston side wall and longitudinally spaced from the piston closed end, said piston pin being connected by a connecting rod to a crankshaft through which reciprocating motion of the piston is converted to rotating motion of the crankshaft and whereby air and combustion gas pressures acting on the piston are in part converted to side thrust forces acting on the piston side wall and centered on the thrust receiving portions laterally opposite the piston pin, said piston side wall being in closely spaced relation and slidably engagable with the cylinder to transfer the side thrust forces thereto, a first compression piston ring in the ring groove closest the piston closed end and a second compression piston ring in the other ring groove, said rings engaging the cylinder to imperfectly seal the combustion chamber and limit the leakage of pressurized air and combustion gases from the chamber toward the piston side wall, the piston rings, piston and cylinder together defining an annular clearance space between the rings which normally contains blowby gases at pressures intermediate the pressures in the combustion chamber and at the piston side wall, a pair of gas bearing recesses in the side wall and extending partially thereabout, said recesses facing the cylinder and being disposed opposite one another in the thrust receiving portions laterally spaced from the piston pin, passage means in the piston passing inwardly of the second piston ring and separately communicating each of the bearing recesses exclusively with the annular clearance space to communicate blowby gas therein to the bearing recesses to aid in supporting thrust loads, said passage means each including restriction means to limit the flow of blowby gases to the respective pads so that leakage of blowby gas from the unloaded pad will not deplete the supply of pressurized blowby gas to the loaded pad.

* * * * *

UNITED STATES PATENT AND TRADEMARK OFFICE
CERTIFICATE OF CORRECTION

PATENT NO. : 4,111,104
DATED : September 5, 1978
INVENTOR(S) : Ellard D. Davison, Jr.

It is certified that error appears in the above-identified patent and that said Letters Patent are hereby corrected as shown below:

Column 4, line 59, "bearing" should read --bearing pad--.

Column 5, line 10, "his" should read --this--.

Column 6, line 42, "portion" should read --position--.

Column 7, line 5, "rings" should read --piston rings--.

Signed and Sealed this

Seventeenth Day of April 1979

[SEAL]

Attest:

RUTH C. MASON
Attesting Officer

DONALD W. BANNER
Commissioner of Patents and Trademarks